United States Patent [19]

Cody, Jr. et al.

[11] Patent Number: 4,780,990

[45] Date of Patent: Nov. 1, 1988

[54] MACHINE AND PROCESS FOR FORMING LONGITUDINALLY CURVED TOOTH GEARS

[75] Inventors: George P. Cody, Jr., Victor; Theodore J. Krenzer, West Rush, both of N.Y.

[73] Assignee: The Gleason Works, Rochester, N.Y.

[21] Appl. No.: 874,981

[22] Filed: Jun. 16, 1986

[51] Int. Cl.$^4$ ................................. B23F 9/02
[52] U.S. Cl. ..................... 51/52 R; 51/287
[58] Field of Search ............. 51/52 R, 95 GH, 95 TG, 51/105 GG, 287

[56] References Cited

U.S. PATENT DOCUMENTS

| | | | |
|---|---|---|---|
| 1,676,371 | 7/1928 | Wildhaber | 51/52 R |
| 1,982,050 | 11/1934 | Gleason et al. | 51/52 R |
| 2,836,014 | 5/1958 | Calderwood | 51/52 R |
| 2,897,634 | 8/1959 | Wildhaber | 51/52 R |

FOREIGN PATENT DOCUMENTS 0496120  2/1976  U.S.S.R. ................ 51/52 R

Primary Examiner—Frederick R. Schmidt
Assistant Examiner—Robert A. Rose
Attorney, Agent, or Firm—Thomas B. Ryan; Morton A. Polster; Ralph E. Harper

[57] ABSTRACT

A method and machine for forming longitudinally curved tooth surfaces in bevel and hypoid gears. A dish-shaped grinding wheel 26 is rotated about its axis 76 and oscillated about a cradle axis 66 in a timed relationship with a relative reciprocation of a work gear 20 along cradle axis 66. The timed relationship is defined by a power series equation to permit a simultaneous form grinding of adjacent tooth sides of one member of a work gear pair to be appropriately mismatched with simultaneously generated adjacent tooth sides of the mating member of the gear pair. A dish-shaped grinding wheel 176 having inner and outer stock removing surfaces 178, 180 for working opposite sides of gear teeth is also used in accordance with special timed motions of the present invention to improve contact characteristics between mating gear teeth.

17 Claims, 11 Drawing Sheets

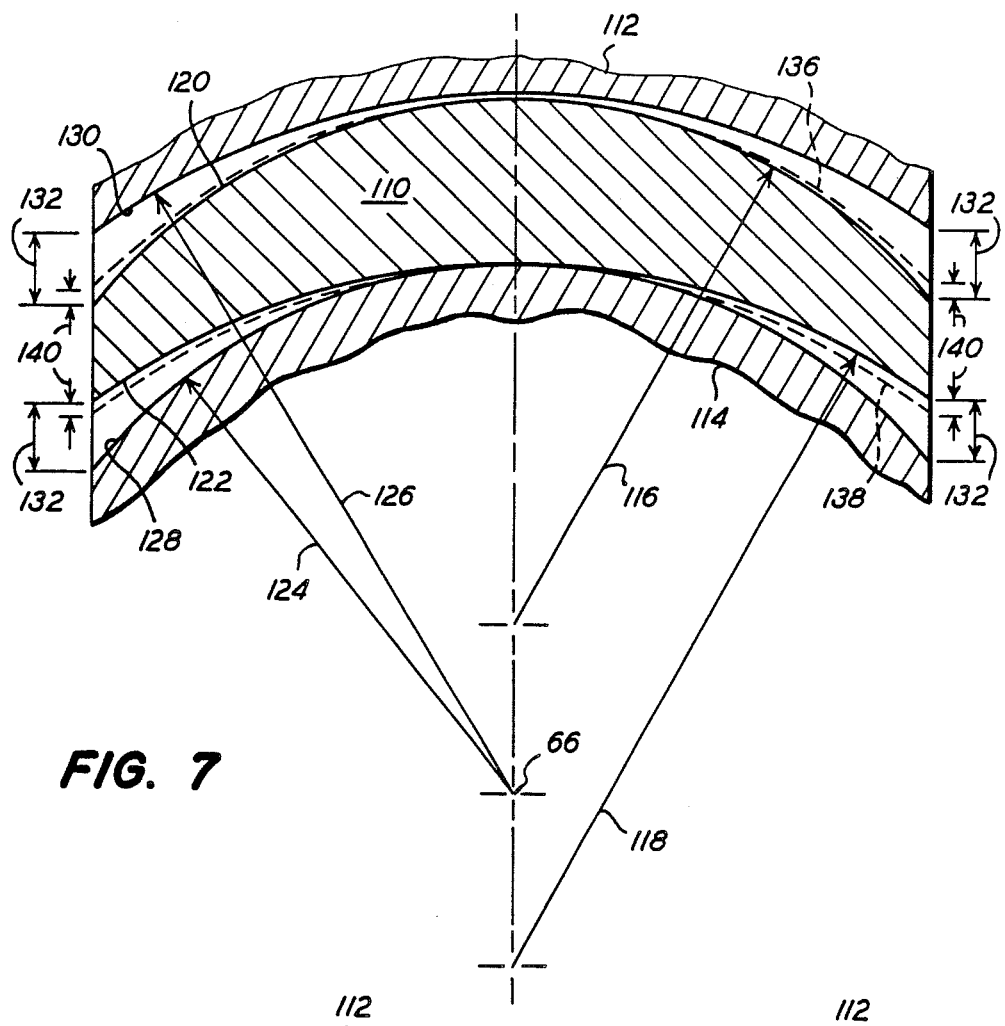
FIG. 7
FIG. 8  FIG. 9

MACHINE AND PROCESS FOR FORMING LONGITUDINALLY CURVED TOOTH GEARS

BACKGROUND OF INVENTION

The present invention relates to machines and processes for forming longitudinally curved tooth gears. In particular, the invention relates to machines and processes which use a dish-shaped tool for precision forming of curved tooth gears, such as spiral bevel and hypoid gears.

For over 50 years, dish-shaped grinding wheels have been used on gear grinding machines for finish grinding spiral bevel and hypoid gears. These machines are arranged for rotating a dish-shaped grinding wheel about its axis while simultaneously oscillating the grinding wheel through an arc corresponding to the desired longitudinal shape of a bevel or hypoid gear tooth. Advantages related to the use of such dish-shaped grinding wheels are well known and clearly disclosed in U.S. Patent to Taylor, U.S. Pat. No. 1,830,971. A primary advantage of these grinding wheels is that they provide sufficient clearance between the operating surfaces of the wheels and tooth surfaces being ground to promote access of coolant to the grinding area and to resist overheating and damage to tooth surfaces.

According to known methods for grinding hypoid or bevel gear teeth, machines with dish-shaped grinding wheels are used to simultaneously form-grind adjacent tooth sides of one member of a work gear pair, but the adjacent tooth sides of the other gear member are generated separately with a conventional cup-shaped grinding wheel. The separate treatment of the gear tooth sides in one member of a work gear pair has been required to appropriately mismatch the longitudinal tooth curvatures of the form-ground member. Typically, a small amount of mismatch between mating tooth curves is desirable to permit some adjustment in the operating positions of the mating gears, however, the amount of mismatch associated with an attempt to simultaneously form adjacent gear teeth in both members of a mating gear pair by known methods, may greatly exceed desirable mismatch between mating tooth curves. Likewise, the formation of adjacent gear tooth sides of at least one member of a mating work gear pair in separate working steps or operations, as an alternative to simultaneously forming adjacent gear teeth in both members, is time consuming and may add considerable cost to the manufacture of the work gear pair.

Also according to known method, longitudinal mismatch is provided between mating bevel and hypoid gear teeth by adjusting the radius of a cup-shaped grinding wheel used to grind a tooth side on one member of a gear set with respect to the radius of oscillation of a dish-shaped grinding wheel used to grind a mating tooth side of the other member of the pair. Longitudinal mismatch between mating tooth sides is determined by the difference between the respective radii of the cup-shaped wheel and arcuate path of oscillation of the dish-shaped wheel. Thus, known mismatch between mating bevel and hypoid gear teeth may be represented as the separation between two arcs of different radii that are theoretically coincident at a single point. Under load, however, mating gear teeth tend to deform slightly and contact between the two surfaces spreads out over a portion of tooth length.

Although known mismatched bevel and hypoid tooth surfaces may accommodate some adjustments to their running positions, contact between mating tooth surfaces tends to shift quite rapidly to tooth ends under conditions of misalignment or heavy loads. Contact at tooth ends is highly undesirable and may cause excessive noise or tooth breakage. It is also known to increase mismatch by increasing the difference between the respective radii of tooth curvature of mating tooth surfaces. Increased mismatch tends to resist the shifting of tooth contact to tooth ends. However, increased mismatch also tends to undesirably shorten the contact pattern between mating gear teeth leading to increased contact stresses and wear, and decreased load carrying capacity of the gear teeth. Accordingly, the amount of adjustment which may be accommodated by mismatched bevel and hypoid gear teeth formed according to known methods may be undesirably limited by the load carrying requirements of the gear teeth.

SUMMARY OF INVENTION

The present invention includes a machine and process for simultaneously form-grinding adjacent gear tooth sides of one member of a mating hypoid or bevel gear pair to appropriately mismatch simultaneously generated adjacent tooth sides of the other member of the mating pair. In the context of this specification references to "simultaneously form-grinding adjacent tooth sides" is intended to define a process in which adjacent tooth flanks perpendicular to the lengthwise direction of the work gear teeth take the form of the grinding wheel used to grind the adjacent tooth-flanks. Reference to "simultaneously generated adjacent tooth sides" is intended to define a process in which an additional rolling motion is applied between a work gear and grinding wheel to form adjacent tooth flanks which are shaped to roll together with the form ground flanks of a mating work gear.

The machine of the present invention includes conventional features of a machine base, work and tool supports mounted on the base, a cradle journalled for rotation about its axis in the tool support, a dish-shaped grinding wheel journaled in the cradle for rotation about its axis and means for relatively oscillating the grinding wheel with respect to the work support about the cradle axis. The machine of the present invention also includes novel means for relatively reciprocating the work support with respect to the tool support in a direction generally along the cradle axis and in a timed relationship with the oscillating means for defining a working path of the dish-shaped wheel. The timed relationship between the reciprocation of the work support and oscillation of grinding wheel may be defined so that a work gear may be withdrawn with respect to the dish-shaped grinding wheel at the ends of the working path. This specially defined timed relationship is provided for controlling the respective radii of longitudinal tooth curvature of adjacent gear teeth in one member of a work gear pair to appropriately mismatch simultaneously formed adjacent gear teeth in the gating member of the pair. Appropriate matching of longitudinal tooth curves includes a small amount of mismatch intended to permit some adjustment in the relative running position of the gear pair. In addition, the timed relationship between the reciprocating work support and oscillating tool support may be further defined to provide improved running characteristics of the mating gear pair.

The present invention also provides for an improved process for grinding hypoid and bevel gears. The process includes the steps of mounting a work gear and a dish-shaped grinding wheel on respective supports in a known manner and relatively oscillating the grinding wheel about a cradle axis which extends substantially perpendicular to the lengthwise direction of a tooth to be formed in the work gear. The inventive process also includes the important steps of reciprocating the work support substantially along the cradle axis in a timed relationship with the oscillation of the grinding wheel and controlling this timed relationship so that the rate of displacement of the work support along the cradle axis changes with respect to the angular displacement of the grinding wheel about the cradle axis.

The above-described timed relationship may be further defined by a power series equation in which the displacement of the work support is determined as a function of the angular displacement of the dish-shaped grinding wheel. Specific terms of the power series equation may be used to control relative machine motions to produce an improved form of mismatch between mating gear teeth. For example, the timed relationship between the reciprocation of the works support and oscillation of the dish-shaped wheel may be controlled so that the rate of withdrawal of the work support increases with respect to the angular displacement of the dish-shaped wheel toward each end of its working path of oscillation. These relative motions are used to reduce excessive mismatch between mating bevel and hypoid gear teeth.

The special timed relationship may also be controlled so that the rate of withdrawal of the work support increases for a portion of the working path and then decreases for a second portion of this path as the dish-shaped wheel approaches each end of its working path. In this case ordinary amounts of mismatch between mating tooth curves may be provided in the central working portion of mating gear teeth while also providing additional mismatch at tooth ends. This improved type of mismatch is believed to preserve desirable contact characteristics between mating gear teeth over a wider range of loads and mounting adjustments.

BRIEF DESCRIPTION OF DRAWINGS

These and other features and advantages of the present invention will become apparent in a more detailed discussion which follows, and in that discussion reference will be made to the accompanying drawings as briefly described below.

FIG. 7 is a cross sectional diagram of mating gear teeth as each mating gear member would appear if adjacent tooth sides of both members were to be simultaneously formed according to known methods in comparison with a modified tooth shape according to the present invention.

FIG. 8 is a side view of a gear tooth showing an undesirable contact pattern between the mating gear teeth of FIG. 7 associated with use of the known methods.

FIG. 9 is a side view of a gear tooth showing a desirable contact pattern which is achievable in accordance with the present invention.

DESCRIPTION OF THE PREFERRED EMBODIMENTS

Figure 1:
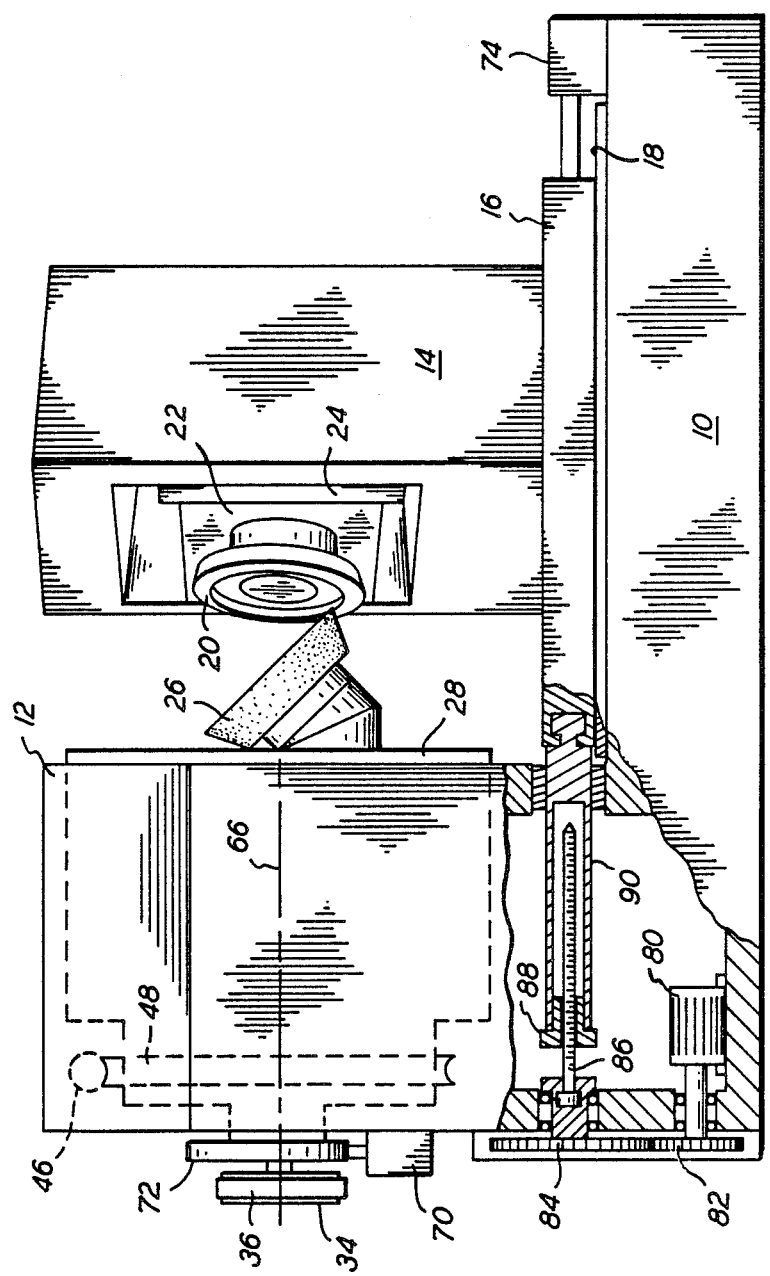
FIG. 1 is a side view, partly in cross section, of a machine arranged according to one embodiment of the present invention.

A machine of the general type contemplated for use in the present invention is illustrated in FIG. 1. The machine includes the general features of a base 10, a tool support 12, and a work support 14. Tool support 12 is mounted directly on base 10 and work support 14 is mounted on sliding base 16 which is carried by ways IS formed on the upper face of base 10. A work gear 20 is journaled in work head 22 which is carried on slides 24 for vertical adjustment within the work support. A dish-shaped grinding wheel 26 is journaled for rotation about its axis within cradle 28. Cradle 28, in turn, is journaled for oscillation about cradle axis 66 within the tool support 12.

Figure 2:
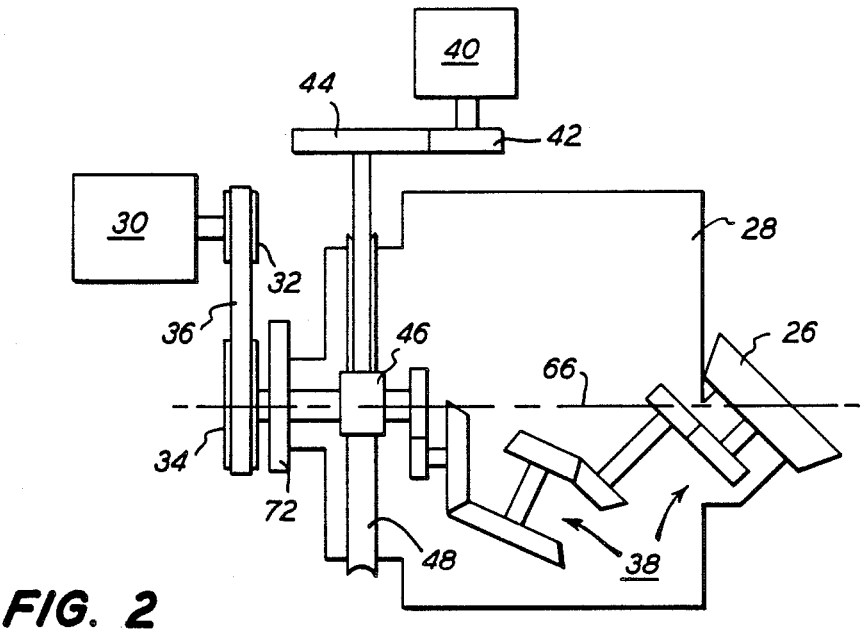
FIG. 2 is a schematic illustration of a drive arrangement for motion to a dish-shaped tool.
Figure 3:
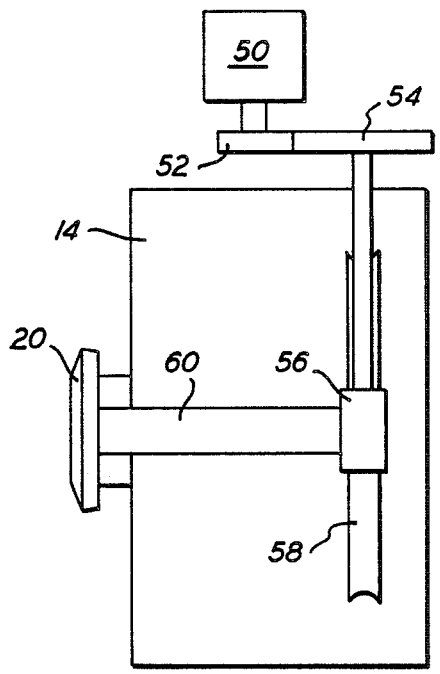
FIG. 3 is a schematic illustration of a drive arrangement for indexing a work gear.

Drive arrangements for the tool and work gear are schematically illustrated in FIGS. 2 and 3. Dish-shaped grinding wheel 26 is driven by motor 30 through change speed pulleys 32, 34, connecting belt 36 and a train of gearing 38 carried within cradle 28. Motor 40 is provided for imparting an oscillatory movement to cradle 28 about cradle axis 66 through reduction gears 42, 44 to a worm 46 which is engaged with worm wheel 48 coaxially mounted about cradle 28. A similar type of driving arrangement is provided for indexing work gear 20. Worm wheel 58 is mounted coaxially with work spindle 6 and is driven by worm 56 and reduction gears 52, 54 which are operatively connected to drive motor 50.

Figure 10:
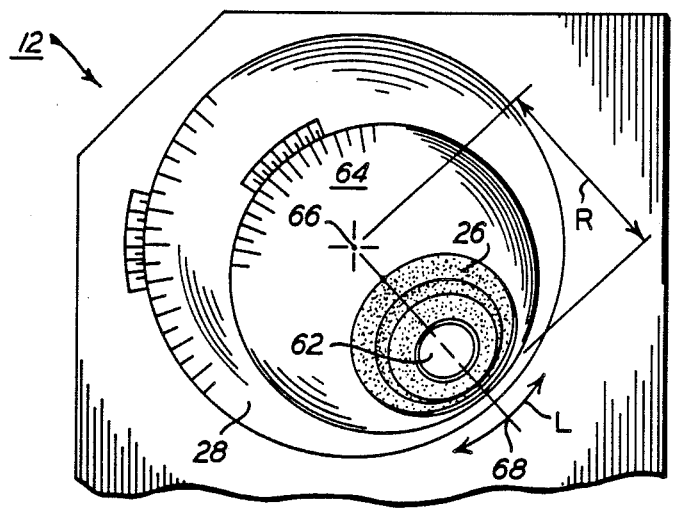
FIG. 10 is a fragmentary front view of a tool support associated with the machine of FIG. 1.

Dish-shaped grinding wheel 26 is journaled for rotation on tool spindle 62 (see FIG. 10) which is carried in eccentric 64. Note, however, the grinding wheel is shown slightly smaller in the view of FIG. 10 so as not to obscure other features of the tool support. Journal means is provided in cradle 28 to rotatively mount eccentric 64 in a position offset from cradle axis 66. Eccentric 64 may be angularly adjusted within cradle 28 to control a distance R measured from cradle axis 66 to the working portion of grinding wheel 26. Cradle 28 is also angularly adjustable about cradle axis 66 to define a center position 68 for oscillation through arc length L.

The basic machine configuration and drive arrangements described above are well known and understood in the art of bevel and hypoid gear manufacturing. Similar or equivalent structures may be identified in U.S. Pat. Nos. 1,982,050, 2,099,694, 2,133,386, and 2,424,271, all of which are commonly owned by the assignee of the present invention and are hereby incorporated by reference.

Figure 4:
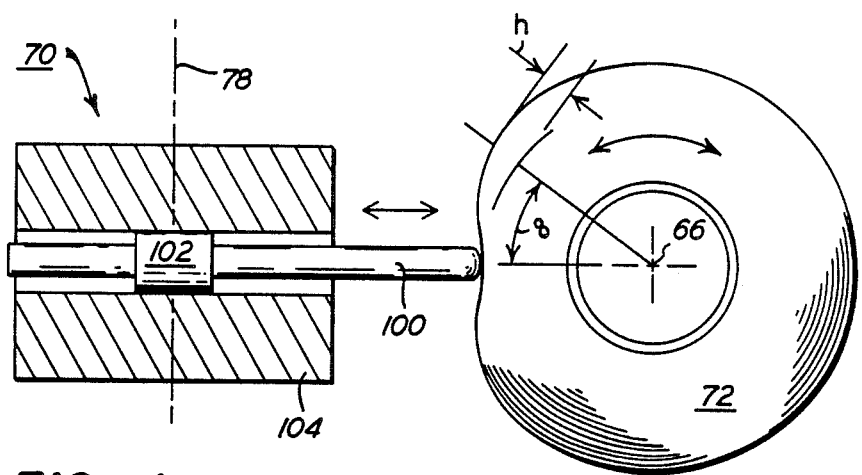
FIG. 4 is across sectional view of a displacement transducer in contact with a cam.
Figure 5:
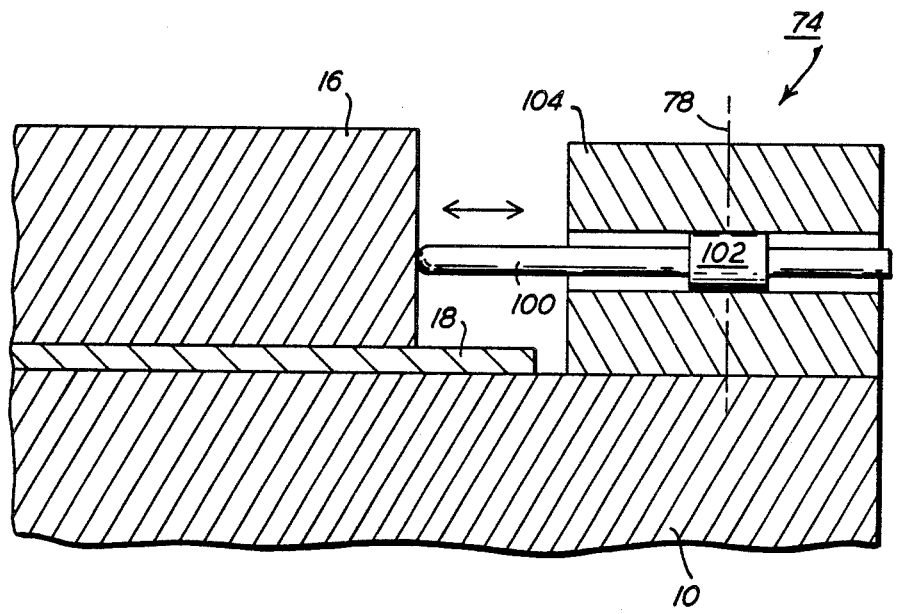
FIG. 5 is a cross sectional view of a displacement transducer in contact with a slide for moving a work support.

Particular to the present invention and illustrated in FIGS. 1, 4, and 5, are exemplary means for controlling in a specially timed arrangement reciprocation of work gear 20 on sliding base 16 with respect to oscillation of dish-shaped grinding wheel 26 on cradle 28 about cradle axis 66. Displacement transducer 70 mounted on tool support 12 is positioned in contact with the eccentric portion of cam 72 to generate a signal responsive to the eccentric throw of cam 72. A second displacement transducer 74 is mounted on base 10 in contact with sliding base 16 to generate a second signal proportional to the linear movement of sliding base 16 along cradle axis 66. Motor 80 is used to advance and withdraw sliding base 16 on ways 18. Reduction gears 82, 84 are driven by motor 80 to impart a rotary motion to screw 86 which is threadably engaged with nut 88 secured to slide extension 90. Rotary motion of screw 16 causes nut 88 and slide extension 90 to advance or withdraw along screw 86 depending on the direction of rotation of motor 10.

Enlarged cross sectional views of displacement transducers 70, 74 are shown in FIGS. 4 and 5. Each transducer 70, 74 includes a probe 100 for respectively contacting cam 72 and sliding base 16. Core 102 is attached to probe 10, and is slidably carried within a bore formed in an oscillator-demodulator shell 104. A signal is generated by the respective transducers proportional to the displacement of core 102 from a designated zero or center position 70 within shell 104. Rotation of cam 72 about cradle axis 66 through angle q, for example, results in the displacement of core 102 from its center position 78 through distance h corresponding to the associated throw of cam 72. A signal is generated by transducer 70 proportional to this displacement. Similarly, the output signal of transducer 74 is proportional to the displacement of sliding base 16 on base 10.

Figure 6:
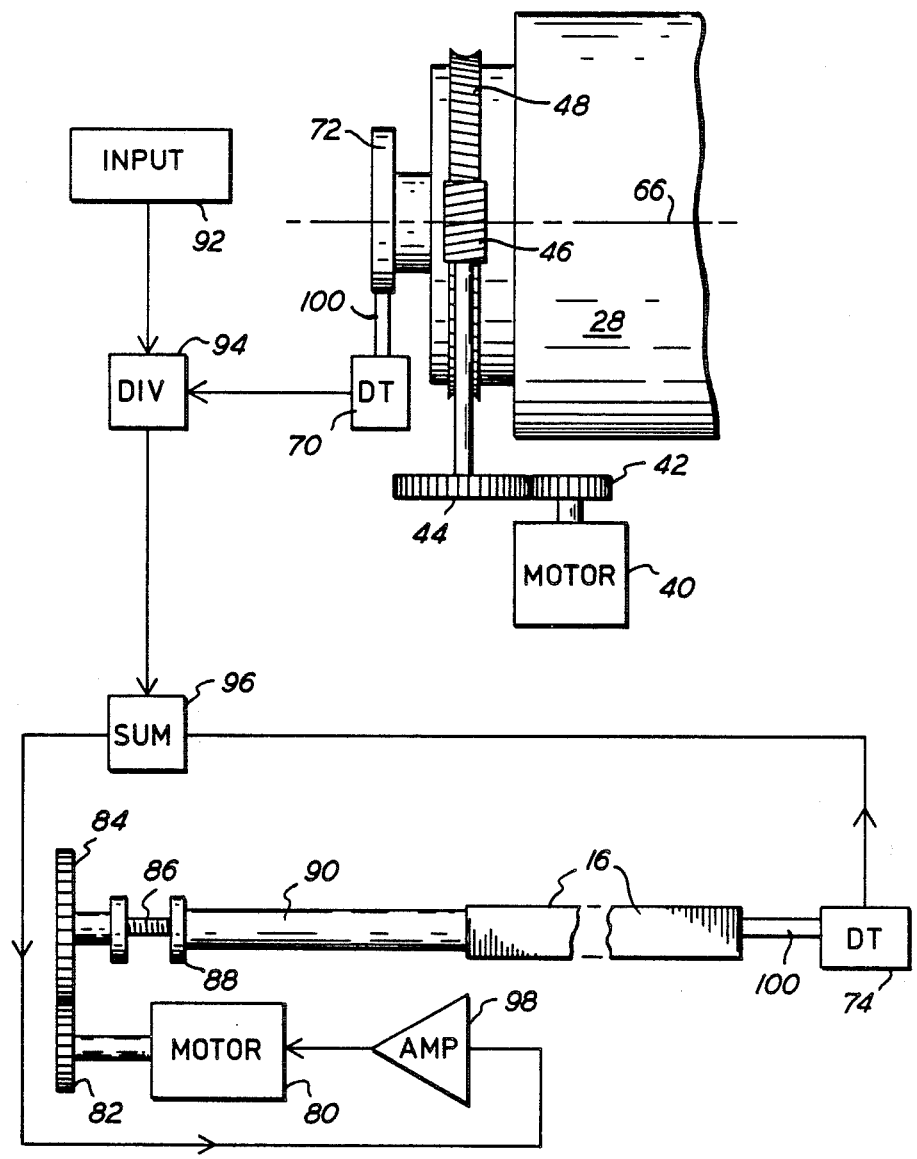
FIG. 6 is a diagram illustrating a control circuit including the displacement transducers of FIGS. 4 and 5 for use with the machine illustrated in FIG. 1.

The output signal from displacement transducer 70 (see FIG. 6) is received by dividing circuit 94, the divisor of which may be input at 92 by the operator. Summing circuit 96 is provided to receive input from transducer 74 as well as input from dividing circuit 94 which outputs a predetermined proportion of the signal from transducer 70. The two transducer signals are combined in summing circuit 96 and an output signal is passed to amplifier 98 which is used to drive motor 80. In this way, the position of sliding base 16 is adjusted so that the signals between the two displacement transducers 70, 74 remain proportional to each other. Thus, the linear position of work gear 20 on sliding base 16 may be controlled with respect to the angular position of dish-shaped grinding wheel 26 on cradle 28.

It should be understood that many other alternative arrangements may be used to control the linear position of sliding base 16 with respect to the angular position of cradle 28. Such arrangements may be entirely mechanical or base on alternative electrical controls. For example, a drive train may be connected to the cradle to rotate a cam which is positioned directly abutting sliding base 16 so that rotation of the cam imparts linear motion to the slide. Alternatively, optical encoders may be provided in place of the displacement transducers and a specific equation may be digitally stored in a computer for generating an output signal relative to angular cradle position. For purposes of the present invention, it is important that the position of the work gear generally along the cradle axis be controlled with respect to the angular position of the dish-shaped grinding wheel about the cradle axis. The specific relationship between the motion of work gear 20 along cradle axis 66 with respect to the angular position of the dish-shaped grinding wheel 26 about cradle axis 66 contemplated in the present invention will now be discussed.

In FIG. 7, pinion tooth 11D and mating gear teeth 112 and 114 are shown schematically in cross section to illustrate problems which have precluded use of dish shaped wheels in processes in which adjacent tooth sides of both members are ground simultaneously. When placed in mesh as illustrated, it can be seen that radius of curvature 116 of convex pinion surface 120 is much smaller than radius of curvature 126 of concave surface 130 of mating, gear tooth 112. In addition, concave surface 122 of pinion tooth 110 includes a much larger radius of curvature 118 than radius of curvature 124 of mating convex surface 128 of gear tooth 114. These undesirably large differences in mating tooth curvatures may arise during alternate tooth side grinding processes because the outside stock removing surfaces of respective grinding wheels are used to form the concave tooth surfaces in both gear members and the inside stock removing surfaces of the respective grinding wheels are used to form the convex tooth surfaces in both members. However, in one direction of rotation of the mating gear pair, convex tooth surfaces of the pinion member are required to mesh with the concave tooth surfaces of the gear and in the opposite direction of rotation the concave tooth surfaces of the pinion are required to mesh with the convex surfaces of the gear. Accordingly, if alternate tooth side grinding processes were to be used according to known methods to simultaneously grind gear tooth spaces in both members, excessive mismatch 132 between mating gear tooth surfaces would result at tooth ends.

FIG. 8 illustrates an undesirable contact pattern on a gear tooth surface which would be expected as the unmodified gear and pinion of FIG. 7 roll through mesh. Lines 134 represent instantaneous lines of contact between the gear and pinion tooth surfaces at discreet angles of roll between the members. The contact pattern is undesirably short in the lengthwise direction of the gear tooth which may result in excessively high contact stresses and disruption of motion transmission between the two members during use.

Referring back to FIG. 7, dashed lines 136 and 138 represent the respective tooth surfaces of gear teeth 112 and 114 modified in accordance with the present invention. It should be noted that mismatch 140 between the mating tooth surfaces of the gear and pinion teeth is greatly reduced. FIG. 9 illustrates a desirable contact pattern on a gear tooth surface as would be expected to result according to the methods of the present invention. Each of the instantaneous lines of contact 142 extends over a desirable portion of tooth length.

Figure 11:
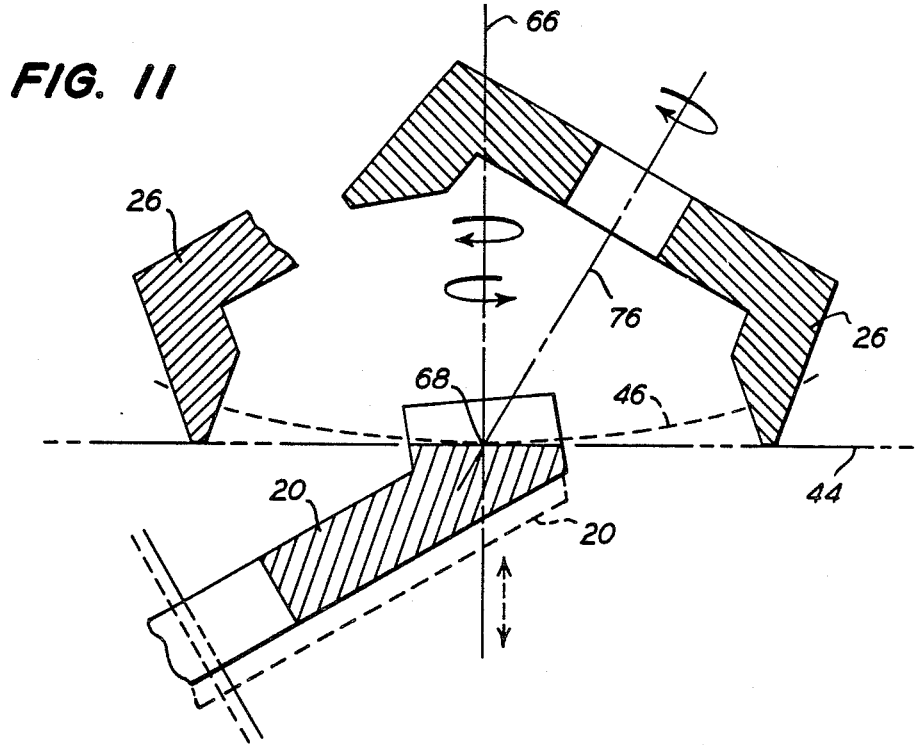
FIG. 11 is a diagram illustrating a novel operating relationship between a dish-shaped tool and work gear as viewed in cross section through a radial plane of the work gear.

In FIG. 11, relative motions of dish-shaped grinding wheel 26 and work gear 20 contemplated in the present invention are illustrated in contrast to known relative motions. Ordinarily, dish-shaped grinding wheel 26 is rotated about its axis 76 and swung in a to and fro motion about cradle axis 66 along line 44 across the face of work gear 20. According to one method of the present invention, however, work gear 20 is reciprocated in a timed relationship with the oscillation of dish-shaped wheel 26 in a direction generally along cradle axis 66 which extends approximately perpendicular to tooth length so that as grinding wheel 26 is swung in either direction away from center 68 of a gear tooth space, work gear 20 is slightly withdrawn. A dashed outline of work gear 20 is used to illustrate motion of the work gear along axis 66. The relative working path of grinding wheel 26 which results from such additional motion is illustrated by dashed line 46.

Figure 12:
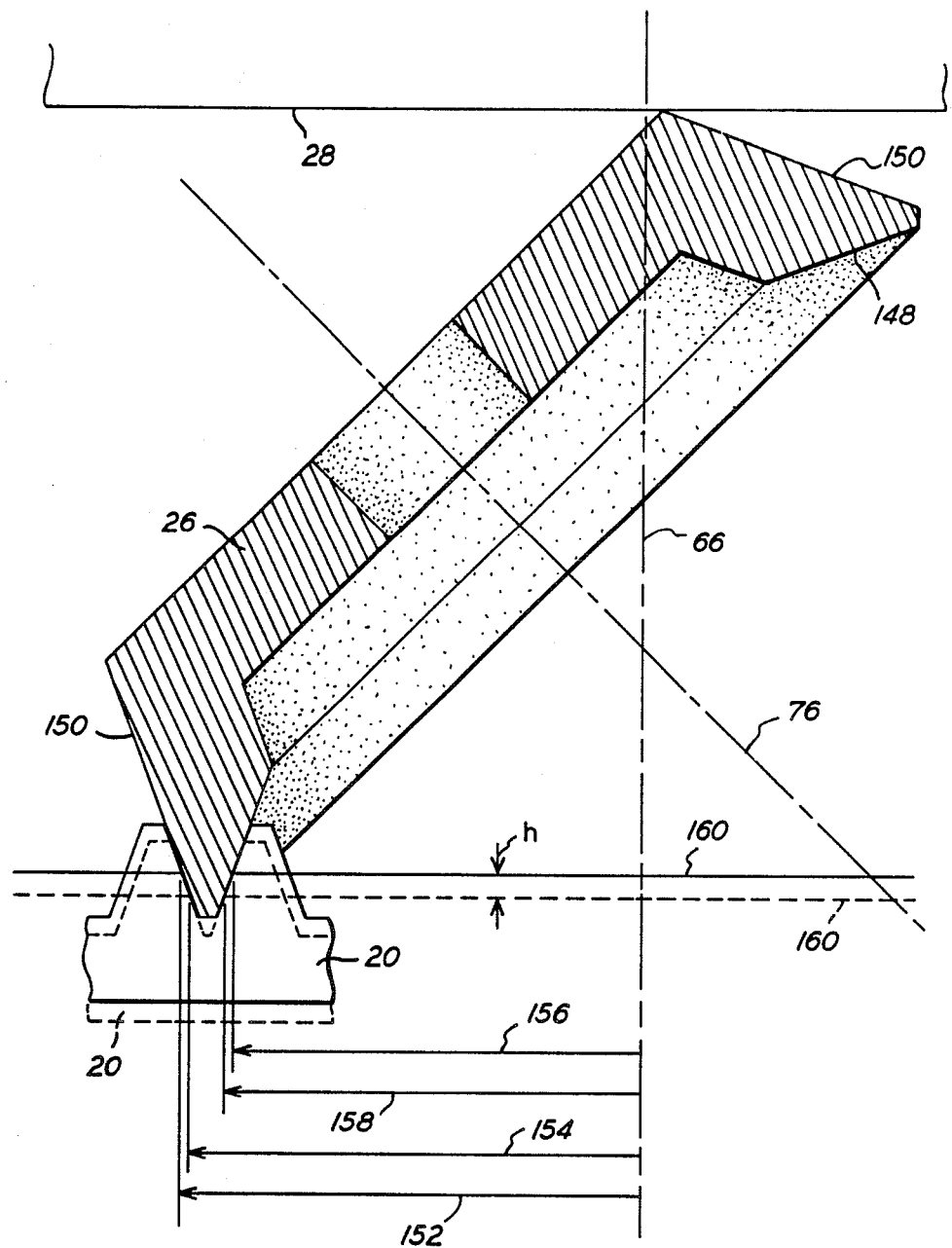
FIG. 12 is a cross sectional view of a dish-shaped tool shown in engagement with a work gear in a plane normal to a tooth surface of the work gear.

In FIG. 12, dish-shaped grinding wheel 26 is shown in cross section through the middle of a gear tooth space in work gear 20. Grinding wheel 26 includes inner stock removing surface 148 and outer stock removing surface 150 located at the periphery of the wheel for working sides of adjacent gear teeth. As wheel 26 is oscillated to and fro about cradle axis 66 from the illustrated middle tooth position, work gear 20 is withdrawn with respect to wheel 26 through distance h. An end position of of the same work gear tooth space which is withdrawn through distance h is depicted by dashed lines in FIG. 12. The withdrawal motion results in the removal of less stock at gear tooth ends. Instantaneous radius of curvature 152 of the concave surface of the work gear measured in pitch plane 160 of the work gear is slightly larger than instantaneous radius of curvature 154 in the same pitch plane due to the withdrawal of the work gear through distance h with respect to the wheel 26. In addition, instantaneous radius of curvature 156 of the convex surface of the work gear is smaller than instantaneous radius of curvature 158 which results after the withdrawal of work gear 20 through distance h. Thus, the radius of curvature of the concave tooth surface of work gear 20 is decreased and the radius of curvature of the convex tooth surface of work gear 20 is increased as work gear 20 is withdrawn from dish-shaped wheel 26 along cradle axis 66.

Figure 13:
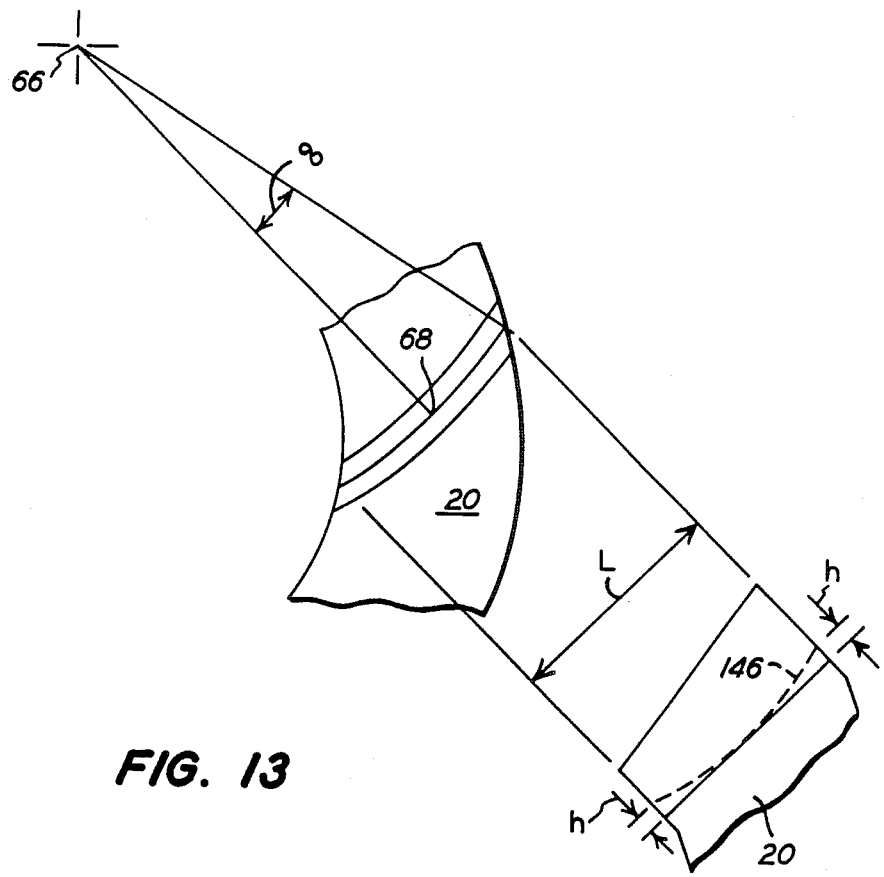
FIG. 13 is a diagram illustrating a novel relationship between the angular position of a dish-shaped tool and the relative linear position of a work gear.
Figure 14:
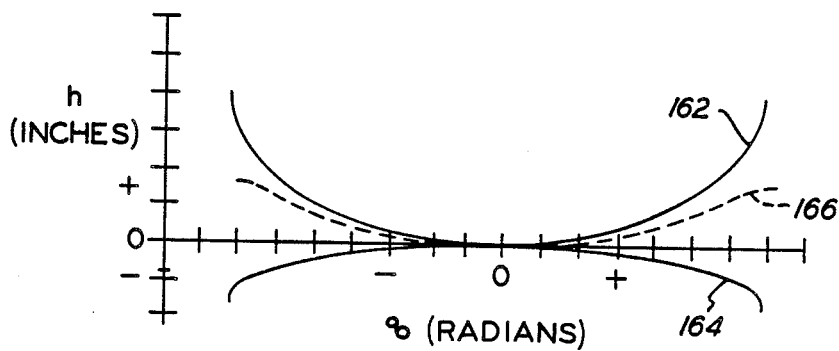
FIG. 14 is a graph illustrating second and a fourth order terms of a power series equation.

The quantitative relationship between the oscillation of dish-shaped grinding wheel 26 across the face of work gear 20 with respect to the reciprocation of the work gear along cradle axis 66 may be more fully understood with reference to FIGS. 13 and 14. As dish-shaped wheel 26 is oscillated about cradle axis 66 through angle q, for example, the work gear is withdrawn through a particular distance h. This relationship may be described mathematically by the following power series equation for a in terms of q:

$$h = a \times q + b \times q^2 + c \times q^3 + d \times q^4 \ldots$$

where coefficients a through d, etc., are selected to control the exact relationship between the respective motions of the dish-shaped wheel and work gear. The ordered terms of the power series considered singularly or in combination define particular curves of j with respect to independent variable q. The even ordered terms ($b \times q^2$, $d \times q^4$, etc.) each contribute to defining a family of "U" shaped curves. The odd ordered terms ($a \times q$, $c \times q^3$, etc.) define a family of "step" shaped curves.

For the purpose of approximately matching simultaneously formed gear teeth on pinion tooth 110, for example, the power series may be shortened to include only the second order term as follows:

$$h = b \times q^2.$$

The equation immediately above includes a second order term to effect an accelerated withdrawal of the work gear with respect to the dish-shaped wheel as the wheel is oscillated to either side of the center or zero position 60 of tooth length. Curve 162 of FIG. 14 depicts a second order curve of h in q. This curve may be formed on the surface of cam 72 so that the radius of the cam increases by h (or some multiple of h) through rotational angle q of the cam in accordance with the above-listed second order equation. Sliding base 16 carrying work gear 20 is thus caused to follow an increasing change in h as the cradle and attached cam are rotated through angle q. The effect of this specific relative motion is to decrease longitudinal mismatch between mating tooth surfaces. For example, mismatch 132 between pinion tooth 110 and mating gear teeth 112 and 114 of FIG. 7 may be reduced to the amount of mismatch measured at 140 due to the accelerated withdrawal of the dish-shaped wheel as it approaches tooth ends.

FIG. 14 illustrates curve 164 which represents the curve of a fourth order power series term. Dashed line 166 of FIG. 14 represents a curve resulting from the sum of second and fourth order power series terms. According to a preferred embodiment of the present invention, the power series of j in q is represented by the following equation.

$$h = b \times q^2 + d \times q^4.$$

Figure 15:
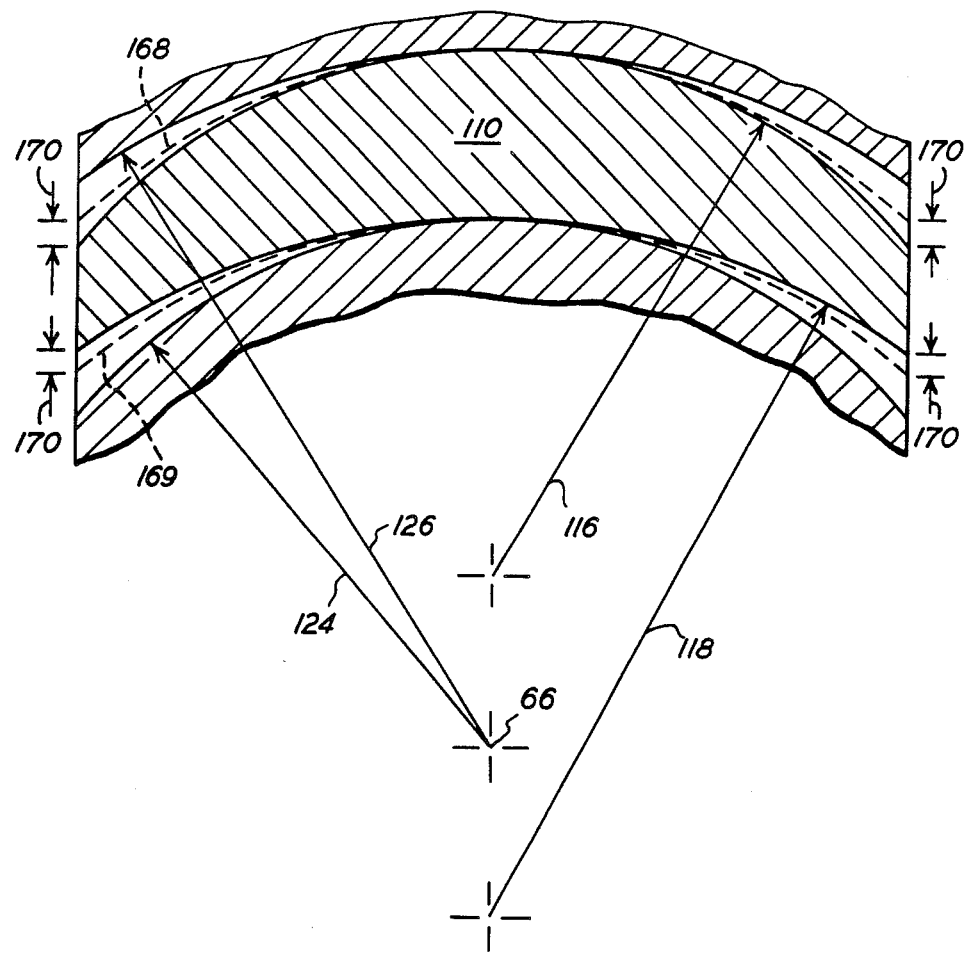
FIG. 15 is a cross sectional diagram of mating gear teeth similar to the view of FIG. 7 showing a preferred tooth shape modification.

It may be seen from FIG. 14 that the contribution of the fourth order term to curve 166 moderates second order increases in h with respect to q. In other words, the combination of the second order curve 162 and fourth order curve 164 to produce curve 166 results in an increasing rate of change of h followed by a decreasing rate of change of h as q is varied to either side (positive or negative) of its zero position. This relationship is used to control the relative motion between the dished wheel and work gear to produce a new type of mismatch illustrated in FIG. 15. It may be noted in comparison with to FIG. 7 that mismatch 170 measured between modified gear tooth curves 168, 169 and pinion tooth 110 is significantly larger than mismatch 140 associated with modified tooth curves 136, 138. However, mismatch occurring toward the center portion of the mating gear teeth in FIG. 15 is changed only slightly with respect to FIG. 7. Although a contact pattern between the mating pinion and gear tooth surfaces of FIG. 15 would be substantially unchanged with respect to FIG. 9, additional mismatch would be provided in the vicinity of the tooth ends. It is believed that this additional mismatch will contribute to maintaining a contact pattern toward the center of the mating gear teeth as the mating gear set is moved slightly out of alignment or heavily loaded during use.

It is also preferred that coefficient d of the fourth order power series term be selected from a range of approximately five to ten times the value of coefficient b of the second order power series term and opposite in sign. The chart below illustrates sample values for this preferred relationship.

| $h = (.22) \times q^2 + (-1.10) \times q^4$ | |
|---|---|
| q (radians) | h (inches) |
| 0 | 0 |
| +/−.1222 | .0030 |
| +/−.2444 | .0092 |

It may be appreciated that other power series terms may be added or substituted to make specific contributions to the contact pattern and loading behavior of the gear teeth formed in accordance with the present invention. For example, the third order term ($c \times q^3$) of the general power series equation may be used to lengthen the contact pattern toward one end of the gear tooth while shortening the length of the contact pattern toward the other end of the gear tooth. In this way, the exact position of the contact pattern along the gear tooth may be controlled.

Figure 16:
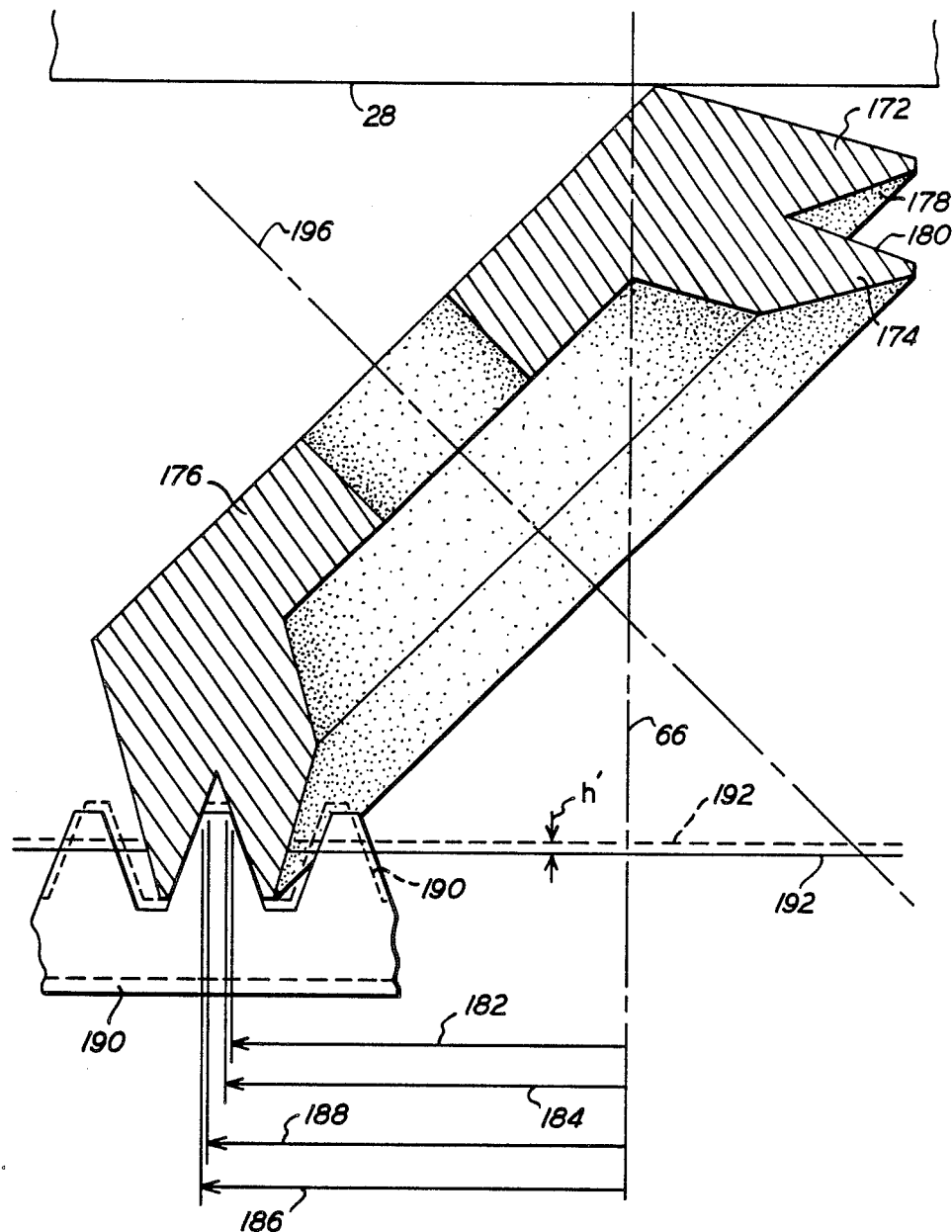
FIG. 16 is a cross sectional view of an alternative tool form characterized by two dish-shaped projections.

Contact pattern control may also be achieved in accordance with the present invention utilizing a dish shaped wheel 176 (see FIG. 16) having an axis of rotation 196 and two annular projections 172, 174 at the periphery of the tool. Wheel 176 includes inner stock removing surface 178 and outer stock removing surface 180 located on the respective annular projections for working opposite sides of gear teeth. Reciprocation of work gear 180 along cradle axis 66 is used to remove additional stock from tooth ends of the work gear to create a desirable amount of mismatch between mating gear teeth. In contrast to the description involving the use of a dish-shaped wheel such as shown in FIG. 12, work gear 190 is advanced toward grinding wheel 176 as the wheel is oscillated from center position 198 (see FIG. 17) of the gear tooth resulting in the removal of additional stock at tooth ends. Instantaneous radius of curvature 182 of the concave surface of work gear 190 measured in pitch plane 192 is slightly smaller than instantaneous radius of curvature 184 in the same pitch plane due to the advancement of work gear 190 through distance h' with respect to grinding wheel 176. In addition, instantaneous radius of curvature 186 of the convex surface of the work gear is larger than instantaneous radius of curvature 199 which results after the advancement of work gear 190 through distance h'. Thus, the radius of curvature of the concave tooth surface of work gear 190 is increased and the radius of curvature of the convex tooth surface of work gear 190 is decreased as the work gear is advanced toward dish-shaped wheel 176 along cradle axis 66.

Figure 17:
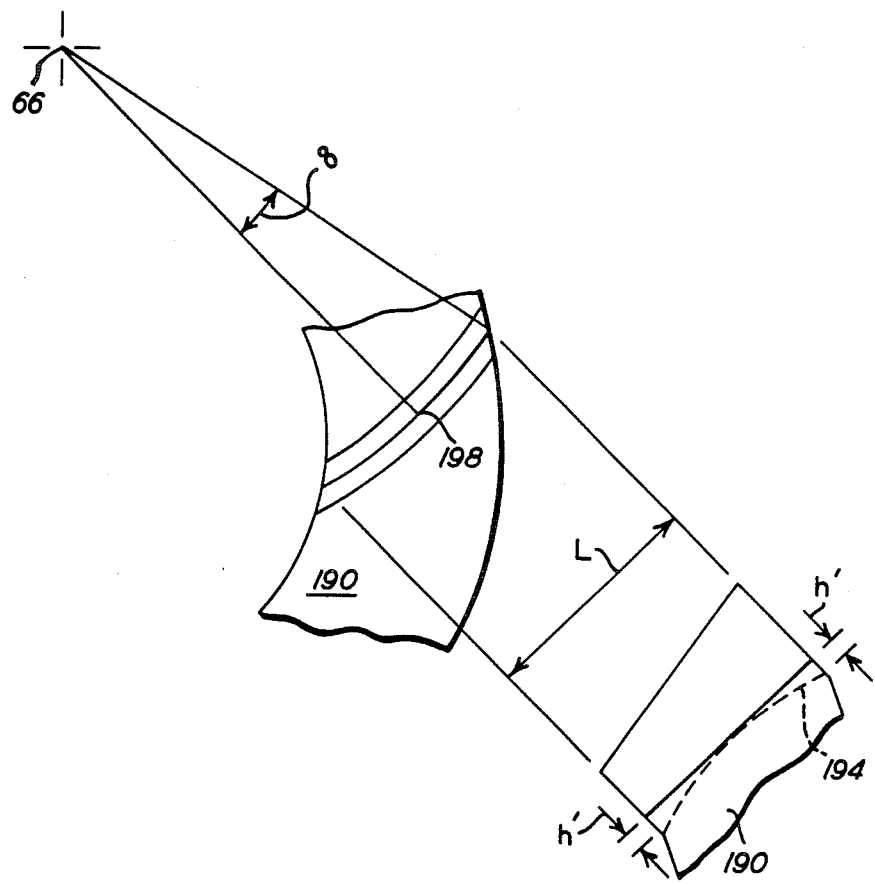
FIG. 17 is a diagram similar to FIG. 13 illustrating an alternative relationship between the angular position of a dish-shaped tool and the relative linear position of a work gear.

FIG. 17 illustrates the relative advance of work gear 190 through distance h' with respect to cradle motion through angle q. In this case, however, value h' is considered negative resulting in the removal of additional stock at tooth ends along working path 194. It is preferred that this relative motion be controlled using the fourth order term of the general power series equation as listed below.

$$h' = d \times q^4.$$

This equation may be used to provide a maximum amount of mismatch at tooth ends while maintaining a minimum mismatch in the central working region between mating gear teeth. The resulting contact pattern between mating gear teeth in this case differs only slightly from the desirable contact pattern shown in FIG. 9, but the additional mismatch at tooth ends provided by the special fourth order relationship listed above is intended to maintain a desirable contact pattern under increased loads and misalignments of the mating gear teeth.

In the above examples, general principles of the present invention have been described and with minor modifications that will be apparent to engineers skilled in the technology of bevel and hypoid gear production many other combinations according to the above principles are possible. For example, the gear tooth member may be formed according to a known process and the pinion member may be modified according to the special relative motions which characterize the present invention to appropriately mismatch the gear tooth surfaces. Also, it would be equally possible to advance the dish-shaped wheel of the present invention generally along the axis of the cradle while maintaining the work gear stationary. The principles also apply to types of bevel or hypoid gear teeth which may be separately formed using intermittent indexing operations or to bevel or hypoid gear teeth which are collectively formed in the gear members using continuous indexing operations. Thus, the principles outlined in the present invention are intended to include a broad application to the formation of spiral bevel or hypoid gear teeth modified according to the special relative motion outlined in the present invention.

What is claimed is:

1. A machine for forming longitudinally curved tooth gears comprising:
   a machine base;
   a work support mounted on said base;
   a tool support mounted on said base;
   a cradle journaled in said tool support;
   a cradle axis passing through said tool support about which said cradle is journaled for rotation;
   a dish-shaped tool journaled for rotation in said cradle in a position offset from said cradle axis;
   means for rotating said tool;
   means for relatively oscillating said tool with respect to said work support about said cradle axis;
   means for relatively reciprocating said work support with respect to said tool in a direction substantially along said cradle axis in a timed relationship with said oscillating means for defining a working path of said tool; and
   said timed relationship being defined by a relative withdrawal of said work support along said cradle axis with respect to the relative angular displacement of said tool about said cradle axis for reducing longitudinal mismatch between mating tooth surfaces of longitudinally curved tooth gears.

2. The machine of claim 1 wherein said working path is further defined by a center and two end positions corresponding to relative angular displacement of said tool about said cradle axis; and
   said timed relationship is further defined by an increase in the rate of relative withdrawal of said work support as a function of the relative angular displacement of said tool along first portions of said working path between said center and each of said end positions.

3. The machine of claim 2 wherein said increase in the rate of relative withdrawal of said work support is followed by a decrease in said rate of relative withdrawal of said work support along second portions of said working path between said first portions and each of said end positions.

4. The machine of claim 3 wherein said dish-shaped tool includes inner and outer stock removing surfaces located at the periphery of said tool for simultaneously working sides of adjacent gear teeth.

5. The machine of claim 1 wherein said working path is further defined by a center and two end positions corresponding to relative angular displacement of said tool about said cradle axis; and and said timed relationship is further defined by the relative withdrawal of said work support along said cradle axis being determined by a power series in terms of the relative angular displacement of said tool about said cradle axis.

6. The machine of claim 5 wherein said power series includes a non-zero second order coefficient defining an increase in the rate of relative withdrawal of said work support along first portions of said working path between said center and each of said end positions.

7. The machine of claim 6 wherein said power series includes a non-zero fourth order coefficient defining a decrease in the rate of withdrawal of said work support along second portions of said working path between said first portions and each of said end positions.

8. The machine of claim 7 wherein said fourth order coefficient is approximately five to ten times larger than the second order coefficient and opposite in sign.

9. A method of forming longitudinally curved tooth gears comprising the steps of:

mounting a work gear on a work support;
mounting a dish-shaped tool on a tool support;
rotating said dish-shaped tool about an axis passing substantially through the center of said tool;
relatively oscillating said tool with respect to said work support about a cradle axis which extends substantially perpendicular to the lengthwise direction of a tooth to be formed in said work gear;
relatively reciprocating said work support with respect to said tool in a direction substantially along said cradle axis in a timed relationship with said step of oscillating said tool for defining a working path of said tool and
controlling said timed relationship to effect a relative withdrawal of said cradle axis for reducing longitudinal mismatch between mating tooth surfaces of longitudinally curved tooth gears.

10. The method of claim 9 wherein adjacent gear tooth sides of both members of a mating gear pair are formed simultaneously and with respect to at least one of said members said working path is further defined by a center and two end positions corresponding to relative angular displacement of said tool about said cradle axis; and said timed relationship is further controlled to effect an increase in the rate of relative withdrawal of said work support as a function of the relative angular displacement of said tool along first portions of said working path defined between said center and each of said end positions.

11. The method of claim 10 wherein said increase in the rate of relative withdrawal of said work support is followed by a decrease in the rate of relative withdrawal of said work support along second portions of said working path between said first portions and each of said end positions.

12. The method of claim 10 wherein said dish-shaped tool includes inner and outer stock removing surfaces located at the periphery of said tool for simultaneously working sides of adjacent gear teeth.

13. The method of claim 9 wherein said working path is further defined by a center and two end positions corresponding to the relative angular displacement of said tool about said cradle axis; and said time, relationship is further defined by the relative withdrawal of said work support along said cradle axis being determined by a power series in terms of the relative angular displacement of said tool about said cradle axis.

14. The method of claim 13 wherein said power series includes a non-zero second order coefficient defining an increase in the rate of relative withdrawal of said work support along first portions of said working path between said center and each of said end positions.

15. The method of claim 14 wherein said power series includes a non-zero fourth order coefficient defining a decrease in the rate of withdrawal of said work support along second portions of said working path between said first portions and each of said end positions.

16. The method of claim 15 wherein said fourth order coefficient is approximately five to ten times larger than the second order coefficient and opposite in sign.

17. A bevel or hypoid gear having longitudinally curved teeth formed according to a method comprising the steps of:

mounting a work gear on a work support;
mounting a dish-shaped tool on a tool support;
rotating said dish-shaped tool about an axis passing substantially through the center of said tool;
relatively oscillating said tool with respect to said work support about a cradle axis which extends substantially perpendicular to the lengthwise direction of a tooth to be formed in said work gear;
relatively reciprocating said work support with respect to said tool in a direction substantially along said cradle axis in a timed relationship with said step of oscillating said tool for defining a working path of said tool;
controlling said timed relationship to effect a relative withdrawal of said work support along said cradle axis with respect to the relative angular displacement of said tool about said cradle axis for reducing longitudinal mismatch between mating tooth surfaces of longitudinally curved tooth gears;
said working path being further defined by a center and two end positions corresponding to relative angular displacement of said tool about said cradle axis; and
said timed relationship being further controlled to effect an increase in the rate of relative withdrawal of said work support as a function of the relative angular displacement of said tool along first portions of said working path defined between said center and each of said end positions followed by a decrease in the rate of relative withdrawal of said work support along second portions of said working path between said first portions and each of said end positions.

* * * * *

UNITED STATES PATENT OFFICE
CERTIFICATE OF CORRECTION

PATENT NO. : 4,780,990

DATED : November 1, 1988

INVENTOR(S) : George P. Cody, Jr. and Theodore J. Krenzer

It is certified that error appears in the above-identified patent and that said Letters Patent is hereby corrected as shown below:

In column 1, line 55, delete "on" and substitute --in--;

In column 2, line 33, delete "tooth-flanks" and substitute --tooth flanks--;

In column 2, line 60, delete "gating" and substitute --mating--;

In column 3, line 55, delete "for motion" and substitute --for imparting motion--;

In column 4, line 42, delete "IS" and substitute --18--;

In column 4, line 61, delete "6" and substitute --60--;

In column 5, line 32, delete "16" and substitute --86--;

In column 5, line 35, delete "10" and substitute --80--;

In column 5, line 40, delete "10" and substitute --100--;

In column 5, line 44, delete "70" and substitute --78--;

In column 6, line 3, delete "base" and substitute --based--;

In column 6, line 20, delete "11D" and substitute --110--;

In column 6, line 28, delete "mating," and substitute --mating--;

In column 7, line 57, delete "a" and substitute --h--;

In column 7, line 65, delete "j" and substitute --h--;

UNITED STATES PATENT OFFICE
CERTIFICATE OF CORRECTION

PATENT NO. : 4,780,990

DATED : November 1, 1988

INVENTOR(S) : George P. Cody, Jr. and Theodore J. Krenzer

Page 2 of 2

It is certified that error appears in the above-identified patent and that said Letters Patent is hereby corrected as shown below:

In column 8, line 4, delete "on" and substitute --in--;

In column 8, line 14, delete "60" and substitute --68--;

In column 8, line 35, delete "j" and substitute --h--;

In column 9, line 46, delete "199" and substitute --188--;

In column 11, line 46, delete "withdrawal of said cradle axis for" and substitute --withdrawal of said work support along said cradle axis with respect to the relative angular displacement of said tool about said cradle axis--;

In column 12, line 11, delete "said time," and substitute --said timed--.

Signed and Sealed this

Ninth Day of May, 1989

Attest:

DONALD J. QUIGG

Attesting Officer

Commissioner of Patents and Trademarks